United States Patent
Urbin-Choffray

(10) Patent No.: US 10,414,217 B2
(45) Date of Patent: Sep. 17, 2019

(54) PATCH FOR AN ELECTRONIC MODULE OF A TIRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Maxime Urbin-Choffray, Clermont-Ferrand (FR)

(73) Assignee: Compagnie Generale des Establissments Michelin, Clermont-Ferrand (FR)

( * ) Notice: Subject to any disclaimer, the term of this patent is extended or adjusted under 35 U.S.C. 154(b) by 161 days.

(21) Appl. No.: 15/536,375

(22) PCT Filed: Dec. 13, 2015

(86) PCT No.: PCT/IB2015/002328
§ 371 (c)(1),
(2) Date: Jun. 15, 2017

(87) PCT Pub. No.: WO2016/097836
PCT Pub. Date: Jun. 23, 2016

(65) Prior Publication Data
US 2017/0341475 A1   Nov. 30, 2017

(30) Foreign Application Priority Data
Dec. 15, 2014   (FR) ..................... 14 02854

(51) Int. Cl.
*B60C 23/04*   (2006.01)
*B29D 30/00*   (2006.01)

(52) U.S. Cl.
CPC ...... *B60C 23/0493* (2013.01); *B60C 23/0483* (2013.01); *B29D 2030/0072* (2013.01); *B29D 2030/0077* (2013.01)

(58) Field of Classification Search
CPC ........... B60C 23/0493; B60C 23/0483; B29D 2030/0072; B29D 2030/0077
See application file for complete search history.

(56) References Cited

U.S. PATENT DOCUMENTS

| | | | |
|---|---|---|---|
| 5,500,065 A | 3/1996 | Koch et al. | 156/123 |
| 6,546,982 B1 * | 4/2003 | Brown | B60C 23/04 152/152.1 |

(Continued)

FOREIGN PATENT DOCUMENTS

| | | |
|---|---|---|
| DE | 10 2005 023 597 A1 | 11/2006 |
| DE | 10 2008 063469 A1 | 1/2010 |

(Continued)

OTHER PUBLICATIONS

International Search Report issued by WIPO dated Mar. 30, 2016, in connection with International Application No. PCT/IB2015/002328 (with English translation attached).

(Continued)

*Primary Examiner* — Nicholas E Hill
(74) *Attorney, Agent, or Firm* — Venable LLP

(57) ABSTRACT

A patch is provided for an electronic device of a tire. The patch includes first and second compartments. The first compartment, which does not include an opening, is structured to house therein an electronic identification module. The second compartment, which includes a reclosable opening, is structured to house therein an electronic module having a complementary function to a function of the (Continued)

electronic identification module. The electronic module is adapted to receive identification data from the electronic identification module.

10 Claims, 1 Drawing Sheet

(56) References Cited

U.S. PATENT DOCUMENTS

| | | | |
|---|---|---|---|
| 7,652,561 B2 | 1/2010 | Pimort | 340/438 |
| 9,679,174 B2 | 6/2017 | Destraves et al. | G06K 7/10425 |
| 9,950,575 B2 * | 4/2018 | Marques | B60C 23/0483 |
| 2002/0046791 A1 * | 4/2002 | Rensel | B60C 23/04 152/151 |
| 2004/0112489 A1 * | 6/2004 | Imbert | B60C 23/0493 152/151 |
| 2007/0175554 A1 * | 8/2007 | Bertrand | B60C 23/0493 152/152.1 |
| 2009/0159169 A1 * | 6/2009 | Durif | B60C 23/0493 152/367 |
| 2012/0239313 A1 * | 9/2012 | Champredonde | G01L 17/00 702/50 |
| 2014/0261944 A1 * | 9/2014 | Papakonstantopoulos | B60C 5/14 152/510 |
| 2015/0191055 A1 * | 7/2015 | Schumacher | B60C 23/0481 340/447 |
| 2015/0282335 A1 * | 10/2015 | Biegner | H05K 5/0004 361/752 |
| 2016/0379020 A1 | 12/2016 | Destraves et al. | G06K 7/10128 |
| 2017/0350781 A1 * | 12/2017 | Ledoux | G01L 17/005 |

FOREIGN PATENT DOCUMENTS

| | | | | |
|---|---|---|---|---|
| EP | 1 384 603 A1 | 1/2004 | | |
| FR | 2 870 031 A1 | 11/2005 | | |
| GB | 2 392 889 A | 3/2004 | | |
| WO | WO-2014041060 A1 * | 3/2014 | | B60C 23/0481 |

OTHER PUBLICATIONS

Mar. 30, 2016 International Search Report and Written Opinion in International Patent Appln. No. PCT/IB2015/002328.

* cited by examiner

PATCH FOR AN ELECTRONIC MODULE OF A TIRE

TECHNICAL FIELD OF THE INVENTION

The present invention relates to a patch for an electronic module of a tire comprising a compartment housing an electronic module.

STATE OF THE PRIOR ART

In general, there are two known solutions for controlling electronic modules of tires.

The first solution is to integrate an electronic module into the tire by fastening it permanently. When this is done, the electronic module is mechanically and irreversibly fixed to the tire. This arrangement enables the data obtained by said module to be associated with the identifier of the corresponding tire. However, this solution prevents the replacement or modification of the electronic module. It is therefore incompatible with electronic systems designed to be removable.

The document FR2870031 describes a tire monitoring method for a land vehicle. This method is executed by means of a central monitoring unit and electronic chips implanted in the sidewalls of the tire. The chips of a single tire carry identical identification codes, together with respective codes representing their locations on the tire.

The second solution consists in providing an electronic module linked to the tire in a removable way. This solution requires the establishment of a pairing between the tire identifier and the electronic module. Various procedures may be followed to establish such a pairing. For example, the pairing may be established by a manual operation of writing the identifier by means of what is commonly called an "RFID" module, or by marking in the memory of the electronic module. The pairing may also be established by using external synchronization frames between the tire identifier and the electronic module. The pairing between the identifier and the electronic module may also be performed via the vehicle. Finally, the pairing may be established by the direct reading of the identifier by the electronic module itself.

The manual pairing solutions or those using external systems require re-pairing on each change of an electronic module or tire. Thus there can be no guarantee of correct pairing. Moreover, pairing via the vehicle requires an infrastructure which is costly and highly intrusive in the vehicle. Finally, the solution of direct reading of the identifier by an electronic module requires good communication between the elements concerned.

The document DE102005023597 describes a vehicle tire on which an electronic module of a tire is arranged in a simple manner. For this purpose, the electronic module is inserted into a pouch which is fastened inside the tire by a two-component fastening means.

Application US2007/0175554 concerns a patch structured to contain an electronic system comprising a sensor for a tire. The surface of the patch is configured to be fastened to the tire.

The aforesaid documents describe the arrangement of patches for housing electronic modules of tires. The prior art refers to the manner in which electronic functions are associated with tires. The electronic functions for tires are therefore controlled by a single electronic module which is either permanently implanted in the tire or applied removably to the tire.

The document DE1020080634469 describes an insert for a tire, this insert being equipped with two compartments. These two compartments are rigidly closed.

The document EP1384603 describes a tire in which an antenna is integrated into the lower area of one of the sidewalls.

The solutions disclosed by the prior art have a number of imperfections, regardless of their arrangements. Consequently there is still a need for an effective solution for controlling different intrinsic functions of the electronic modules of tires, in relation to identification data.

The invention provides various technical means for overcoming these various disadvantages.

SUMMARY OF THE INVENTION

A first object of the invention is to provide a means for the rapid and reversible fastening of an electronic module in the tire.

Another object of the invention is to provide a device which facilitates the control of the distance between an electronic module having an identifier of the tire and another electronic module, if present, in order to facilitate communication between these two modules.

Yet another object of the invention is to provide a device for combining different electronic modules with complementary functions.

Another object of the invention is to provide a fastening system enabling a tire monitoring system to operate without any risk of errors concerning the identification of the tire.

Finally, another object of the invention is to provide a fastening system for using a tire monitoring system in such a way that the log of pressure and/or temperature data obtained for a given tire remains strictly associated with this tire, regardless of any subsequent intervention.

For this purpose, the invention provides a patch for an electronic module of a tire comprising a compartment without an opening, housing an electronic identification data module. The patch further comprises a second compartment designed to house an electronic module with complementary functions, adapted to receive the identification data from the identification data module, in which the second compartment comprises a reclosable opening.

This arrangement permits automatic pairing between the electronic modules inserted in separate and adjacent compartments. For example, if the module with complementary functions is changed or removed, then, when the initial module or a new module is re-installed, the identifier data are automatically transmitted to it by the identification data module.

This arrangement of the compartment with an opening enables an electronic module to be inserted into the compartment with an opening in a reversible manner. Furthermore, this architecture enables various operations, such as the replacement, maintenance, repair or recycling of the module, to be performed on the electronic module with complementary functions. This is because the electronic module inserted into the compartment of the patch provided with an opening may be positioned rapidly and reversibly. Finally, this architecture ensures correct interaction between the electronic modules, these modules being inserted into a single patch for electronic modules of tires.

According to an advantageous embodiment, the electronic identification data module of the patch is designed to supply identification data of the corresponding tire.

According to another embodiment, the electronic module with complementary functions of the patch is designed to provide functions complementary to the functions of the electronic identification data module.

This arrangement may enable reliable pairing to be established between the electronic identification data module and the electronic module with complementary functions. Additionally, if the electronic identification data module includes identification data, this architecture enables the measurements made by the electronic module with complementary functions to be associated with the correct tire, without risk of error.

According to an advantageous variant, the functions of the electronic module with complementary functions are included in the list of the following functions:
  i) temperature measurement,
  ii) pressure measurement,
  iii) cycle measurement.

According to an advantageous variant, the patch comprises a plurality of sheets of two-way stretch fabric.

Also advantageously, the sheets making up the patch are overlapped to form the compartments.

This juxtaposition of sheets has the advantage of allowing the provision of as many compartments as there are separating sheets.

Also advantageously, the patch comprises a sheet designed to be in contact with the wall of the tire. This sheet acts as a contact sheet and is provided so as to adhere to a surface formed by an elastomeric mixture.

According to an advantageous embodiment, the patch comprises a sheet arranged between the two compartments, thus forming a separating sheet.

According to another advantageous embodiment, the compartment with an opening of the patch is formed on one side by the separating sheet and on the other side by one or more sheets which form the reclosable opening.

Also advantageously, the separating sheet of the patch consists of a two-way stretch fabric treated so as not to adhere to the adjacent face of the contact sheet and the adjacent face or faces of the sheet or sheets forming said reclosable opening.

Also advantageously, the sheets forming the reclosable opening of the patch are treated so as not to adhere to the adjacent face of the separating sheet.

The invention also provides a tire comprising a patch as described above, fastened to an inner wall of the tire.

DESCRIPTION OF THE FIGURES

All the details of application are given in the following description, supplemented by FIGS. 1 and 2, provided solely by way of non-limiting example, in which.

DETAILED DESCRIPTION OF THE INVENTION

Figure 1:
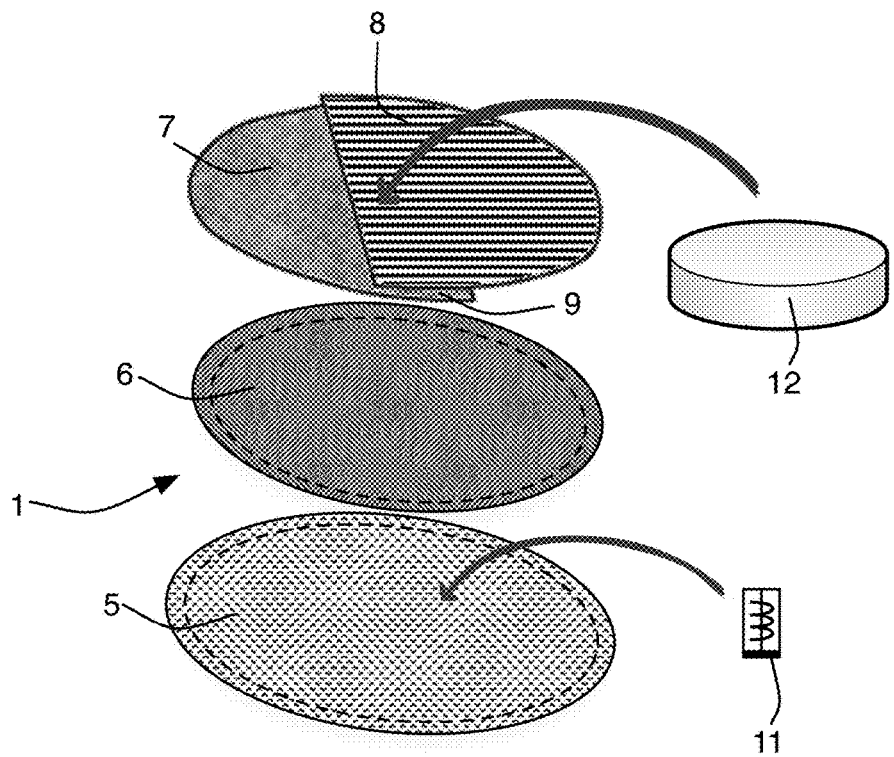
FIG. 1 is an exploded view of the component sheets of the patch for electronic modules of tires.
Figure 2:
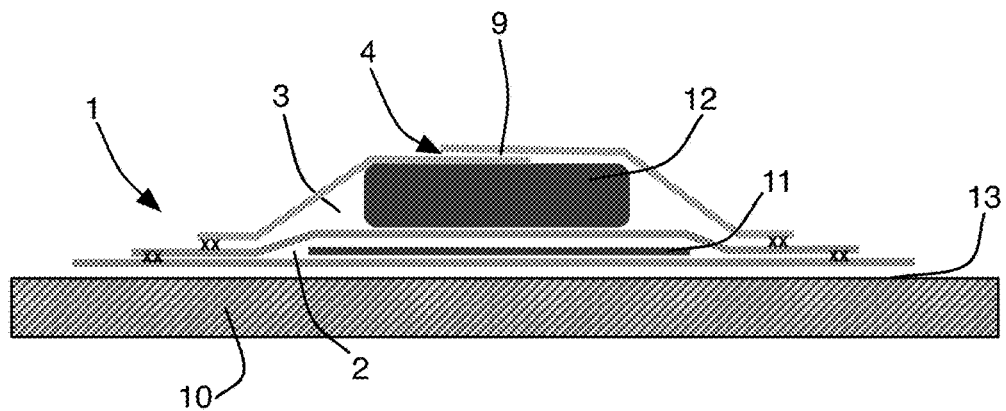
FIG. 2 is a sectional view of all the elements composing the patch according to the invention.

The present invention, as shown schematically in FIGS. 1 and 2, consists of a patch 1 for an electronic module of a tire.

FIG. 1 is an exploded view of the configuration of a patch 1 for an electronic module of a tire, consisting of different sheets 5, 6, 7 and 8. These sheets are positioned so as to delimit at least two distinct compartments having specific characteristics.

Arrangement of the Compartments of the Patch

First of all, the sheets 5 and 6 are fastened together, in alignment with each other, to form a compartment 2 without an opening. This compartment 2 may be used to house an electronic identification data module 11. This electronic identification data module 11 is inserted during the manufacture of the patch 1 and is housed permanently therein. This electronic identification data module 11 is preferably an electronic identification module.

According to the invention, the patch 1 has a second compartment 3. The latter is placed against the compartment without an opening, on the side opposite the face for fastening to the tire 10. To form this compartment 3, the outer sheet 6 of the compartment 2 without an opening is used to form a first wall. The other wall of the compartment is formed by two sheets 7 and 8 laid against the sheet 6. As shown in FIGS. 1 and 2, this compartment 3 has a reclosable opening 4, enabling a module 12 to be housed removably in the compartment 3. In the illustrated example, the compartment 3 with an opening has an opening 4 formed by a specific arrangement of the sheets 7 and 8: each sheet has a semicircular profile, the two half-circles being arranged in opposition, with an overlap area 9 substantially in the centre of the circle. The opening 4 created by this overlap is clearly visible in FIG. 2.

This opening 4 may also be completed by the addition of securing means such as a slide closure, strips with hooks and loops ("Velcro", registered trademark) or other means of closure.

The patch 1 is mechanically fixed to the tire 10. The electronic modules 11 are 12 are inserted in the respective compartments of the patch 1 so as to be movable in these compartments. The fact that the electronic modules are movable makes it possible to avoid subjecting them to the mechanical stresses which the patch 1 undergoes. In fact, if the tire is subjected to a stress, the modules are shifted towards an area subjected to less mechanical stress, as a result of the deformation of the tire 10 and the patch 1. Thus, because of this arrangement in compartments, they are better protected and less liable to suffer damage.

Contents of the Compartments

According to the invention, a first embodiment consists of a patch 1 for electronic modules of tires, comprising at least two compartments 2 and 3, each of the compartments isolating electronic modules 11 and 12 with different functions.

According to this first embodiment, the electronic identification data module 11 installed in the compartment 2 without an opening is adapted to store identifier data of the corresponding tire. Also according to this first embodiment, the electronic module 12 with complementary functions installed in the compartment 3 with an opening is preferably a functional electronic module, the functions of which are complementary to the functions of the electronic identification data module 11. This electronic module 12 with complementary functions may, for example, form part of a tire pressure monitoring system, and may include a pressure sensor and possibly a temperature sensor. The module with complementary functions advantageously comprises a data exchange sub-module, adapted to transmit the acquired data to a data receiving and management module located on the vehicle or on a device outside the vehicle. This sub-module may also be used to receive or read the tire identification data from the identification data module 11. Since the two modules 11 and 12 are always very close together, communication errors are prevented.

If the electronic identification data module 11 contains a tire identifier, the fact that the module is permanently fastened to a given tire ensures that the identification data are completely reliable. The electronic module 12 with complementary functions may thus be removed, or exchanged, without any risk. Any new module receives the identification data from the identification data module 11, which for its part remains unchanged.

According to another embodiment, there may be a greater number of compartments, so that a plurality of electronic modules having different functions may be inserted.

Without departure from the scope of the invention, the patch 1 for an electronic module of a tire, and therefore the compartments 2 and 3 and the inserted electronic modules 11 and 12, may have different respective shapes and arrangements from those shown in FIGS. 1 and 2.

Characteristics of the Sheets Forming the Patch

The sheets 5, 6, 7 and 8 forming the patch 1 for an electronic module of a tire are fixed together by gluing, welding, stitching or any other suitable means.

The surface of the sheet 5 designed to interact with the wall 13 of the tire is made from a compatible material for creating a fastening to this wall 13 by co-vulcanization. By using an elastomeric composition to form the sheet, a permanent, reliable and durable fastening may be obtained. The opposite surface of the sheet 5 and the surfaces of the other sheets are non-adhesive. Additionally, the sheets 6, 7 and 8 are made of stretchable material. This type of material enables the patch to withstand the deformation stresses of the fastening wall in a satisfactory manner, and to be adapted to different types of contents.

The drawings and their descriptions given above illustrate, but do not limit, the invention.

Reference symbols in the claims are entirely non-limiting. The verbs "comprise" and "contain" do not exclude the presence of elements other than those listed in the claims.

REFERENCE NUMERALS EMPLOYED IN THE FIGURES

1 Patch
2 Compartment without an opening
3 Compartment with an opening
4 Reclosable opening
5 Contact sheet
6 Separating sheet
7 Sheet forming the reclosable opening
8 Sheet forming the reclosable opening
10 Tire
11 Electronic identification data module
12 Electronic module with complementary functions
13 Inner wall of the tire

The invention claimed is:

1. A patch for an electronic device of a tire, the patch comprising:
  a first compartment, which does not include an opening, the first compartment being structured to house an electronic identification module;
  a second compartment, which includes a reclosable opening, the second compartment being structured to house an electronic module with a complementary function to a function of the electronic identification module, wherein the electronic module is adapted to receive identification data from the electronic identification module; and
  a plurality of sheets of two-way stretch fabric,
  wherein one of the sheets is a separating sheet placed between the first and second compartments.

2. The patch according to claim 1, wherein the identification data supplied from the electronic identification module to the electronic module is data corresponding to a tire on which the patch is attached.

3. The patch according to claim 1, wherein the electronic module provides complementary functions to functions of the electronic identification module.

4. The patch according to claim 3, wherein the complementary functions of the electronic module include one or more of: a temperature measurement function, a pressure measurement function, and a cycle measurement function.

5. The patch according to claim 1, wherein the sheets are overlapped to form the first and second compartments.

6. The patch according to claim 1, wherein one of the sheets is a contact sheet designed to be in contact with a wall of a tire on which the patch is mounted, the contact sheet being structured to adhere to a wall surface formed of an elastomeric mixture.

7. The patch according to claim 1, wherein the second compartment is formed on one side by the separating sheet and on another side by one or more of the sheets, the one of more of the sheets forming the reclosable opening.

8. The patch according to claim 7, wherein the separating sheet is formed of a two-way stretch fabric that is treated so as not to adhere to an adjacent face of the contact sheet and not to adhere to an adjacent face or adjacent faces of the one or more of the sheets forming the reclosable opening.

9. The patch according to claim 7, wherein the one or more of the sheets forming the reclosable opening is or are treated so as not to adhere to an adjacent face of the separating sheet.

10. A tire comprising:
  an inner wall; and
  the patch according to claim 1,
  wherein the patch is fastened against the inner wall.

* * * * *